United States Patent
Rubinstein et al.

(10) Patent No.: US 7,143,299 B1
(45) Date of Patent: Nov. 28, 2006

(54) METHOD FOR POWER MANAGEMENT OF INTELLIGENT HARDWARE

(75) Inventors: Alan Rubinstein, Fremont, CA (US); Bhakt Patel, Campbell, CA (US)

(73) Assignee: 3Com Corporation, Marlborough, MA (US)

( * ) Notice: Subject to any disclaimer, the term of this patent is extended or adjusted under 35 U.S.C. 154(b) by 601 days.

(21) Appl. No.: 09/956,376

(22) Filed: Sep. 18, 2001

Related U.S. Application Data

(60) Provisional application No. 60/285,419, filed on Apr. 20, 2001, provisional application No. 60/277,592, filed on Mar. 20, 2001, provisional application No. 60/277,451, filed on Mar. 20, 2001, provisional application No. 60/277,767, filed on Mar. 20, 2001, provisional application No. 60/277,593, filed on Mar. 20, 2001.

(51) Int. Cl.
    G06F 1/32    (2006.01)
    G06F 1/26    (2006.01)
    G06F 3/01    (2006.01)
    G06F 15/17   (2006.01)

(52) U.S. Cl. ............ 713/320; 713/300; 713/310; 713/324; 710/5; 709/224

(58) Field of Classification Search ........ 713/300, 713/310, 320, 322, 323, 324, 340
    See application file for complete search history.

(56) References Cited

U.S. PATENT DOCUMENTS

| | | | | |
|---|---|---|---|---|
| 5,129,200 A * | 7/1992 | Kaneko | ........ | 52/205 |
| 5,673,169 A * | 9/1997 | Wicks | ........ | 361/680 |
| 5,815,652 A * | 9/1998 | Ote et al. | ........ | 714/31 |
| 5,842,027 A * | 11/1998 | Oprescu et al. | ........ | 713/300 |
| D404,025 S * | 1/1999 | Van Horne et al. | ........ | D14/331 |
| 6,070,140 A * | 5/2000 | Tran | ........ | 704/275 |
| 6,219,228 B1 * | 4/2001 | Sun | ........ | 361/680 |
| 6,282,655 B1 * | 8/2001 | Given | ........ | 713/200 |
| 6,304,895 B1 * | 10/2001 | Schneider et al. | ........ | 709/203 |
| 6,408,395 B1 * | 6/2002 | Sugahara et al. | ........ | 713/310 |
| 6,578,498 B1 * | 6/2003 | Draudt et al. | ........ | 108/50.02 |
| 6,650,322 B1 * | 11/2003 | Dai et al. | ........ | 345/212 |

* cited by examiner

*Primary Examiner*—James K. Trujillo

(57) ABSTRACT

A method and device for power management of intelligent hardware (e.g., an intelligent data concentrator) for providing access to voice and data networks. Power use data of the intelligent hardware is obtained, wherein the intelligent hardware is coupled to a power source and communicatively coupled to a voice or data network. The intelligent hardware is configured to communicatively couple a plurality of electronic devices to the network. Using the power use data, a power mode of the intelligent hardware is determined. In one embodiment, the present invention comprises a first interface for communicatively coupling the intelligent hardware to the network and a power source and a second interface for communicatively coupling the intelligent device to the plurality of client devices. The intelligent device also comprises means for processing and interpreting data coupled to the first interface, and power mode control means coupled to the means for processing and interpreting data.

31 Claims, 6 Drawing Sheets

METHOD FOR POWER MANAGEMENT OF INTELLIGENT HARDWARE

RELATED U.S. APPLICATIONS

This application claims priority to the copending provisional patent applications: patent application Ser. No. 60/277,593, entitled "'Intellijack' physical concepts," with filing date Mar. 20, 2001, and assigned to the assignee of the present invention; patent application Ser. No. 60/277,767, entitled "A method for managing intelligent hardware for access to voice and data networks," with filing date Mar. 20, 2001, and assigned to the assignee of the present invention; patent application Ser. No. 60/277,451, entitled "A method for filtering access to voice and data networks by use of intelligent hardware," with filing date Mar. 20, 2001, and assigned to the assignee of the present invention; patent application Ser. No. 60/277,592, "'Intellijack' usage," with filing date Mar. 20, 2001, and assigned to the assignee of the present invention; and patent application Ser. No. 60/285,419, "Intelligent concentrator," with filing date Apr. 20, 2001, and assigned to the assignee of the present invention.

FIELD OF INVENTION

The present invention relates to the field of computer networks. In particular, the present invention relates to a method for power management of intelligent hardware for providing access to voice and data networks.

BACKGROUND OF THE INVENTION

In a large number of working environments, people use a large number of electronic devices connected to a network to perform the duties of their jobs. Any one person may have several electronic devices located within their personal area network (PAN). For example, these electronic devices may include a computer system, a voice IP telephone and a printer.

Currently, a growing concern of businesses is the increasing cost of power. Often, electronic devices are turned on, and thus consume power, even if they are not in use. For example, an electronic device may remain turned on after business hours, over the weekend or holidays, or in an empty office or cubicle. Often, this is simply due to human forgetfulness. However, the cost of paying for the use of these electronic devices, particularly in large corporations with thousands of electronic devices, can be very high. Presently, this concern is of great importance not only to those footing the bill for the power consumption, but those persons not able to get power due to the consumption of unused electronic devices (e.g., resulting in a blackout).

Often, if an electronic device is not manually powered off or placed in a low power mode, the electronic device will continue to consume power at its typical rate. While, some electronic devices may be programmed to be powered off or placed in a low power mode automatically (e.g., sleep mode of a computer system), there is currently no way to change the power mode of all devices in a PAN based on detected activity or predetermined criteria.

In most situations, electronic devices are coupled to a network through a simple router or hub, and the activity of the electronic device cannot be easily monitored. Furthermore, most electronic devices receive power from an independent power source distinct from the network. As a result, there us currently no way to detect the power usage of electronic devices in a PAN, and to adjust their power mode accordingly.

A need exists for a method and a device thereof for detecting the level of activity of electronic devices in a PAN. A need also exists for a method and a device thereof for automatically turning off the electronic devices or placing the electronic devices in a low power mode when they are not being used or according to predefined criteria. Particularly, a need exists for a method and a device thereof for managing the power mode of electronic devices in a PAN.

SUMMARY OF THE INVENTION

Accordingly, the present invention provides a method and a device thereof for detecting the level of activity of electronic devices in a PAN. The present invention also provides a method and a device thereof for automatically turning off the electronic devices or placing the electronic devices in a low power mode when they are not being used or according to predefined criteria. The present invention also provides a method and a device thereof for managing the power mode of electronic devices in a PAN.

A method and device for power management of intelligent hardware (e.g., an intelligent data concentrator) for providing access to voice and data networks is presented. Power use data of the intelligent hardware is obtained, wherein the intelligent hardware is coupled to a power source and communicatively coupled to a voice or data network. The intelligent hardware is configured to communicatively couple a plurality of electronic devices to the network. Using the power use data, a power mode of the intelligent hardware is determined.

In one embodiment, the present invention comprises a first interface for communicatively coupling the intelligent hardware to the network and a power source and a second interface for communicatively coupling the intelligent device to the plurality of client devices. The intelligent device also comprises means for processing and interpreting data (e.g., a processor) coupled to the first interface, and power mode control means coupled to the means for processing and interpreting data. In one embodiment, the power mode control means is configured to obtain the power use data of the intelligent hardware and is configured to use the power use data to determine a power mode of the intelligent hardware.

In one embodiment, the intelligent hardware is communicatively coupled over the network to a central control site, wherein the power use data is defined at the central control site. In another embodiment, the power use data is predefined and stored in intelligence of the intelligent hardware. In one embodiment, the power use data is user-defined.

In one embodiment, the power use data is obtained by detecting a level of activity of the intelligent hardware (e.g., data transfer through the intelligent hardware). In another embodiment, the power use data is obtained by detecting a level of activity within a predetermined area containing the intelligent hardware. The level of activity may be detected by a variety of sensors, including but not limited to a motion detector, a heat sensor or a sound detector.

In one embodiment, the present invention provides a method and device for automatically turning an intelligent data concentrator off or placing an intelligent data concentrator into a low power mode. In one embodiment, the low power mode or off mode is activated based on the time of day, week, or year. In one embodiment, the intelligent hardware is configured to supply power from the power source to the plurality of electronic devices. In one embodiment, changing the power mode if the intelligent hardware operates to change the power of mode to each electronic device coupled to receive power through the intelligent hardware.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
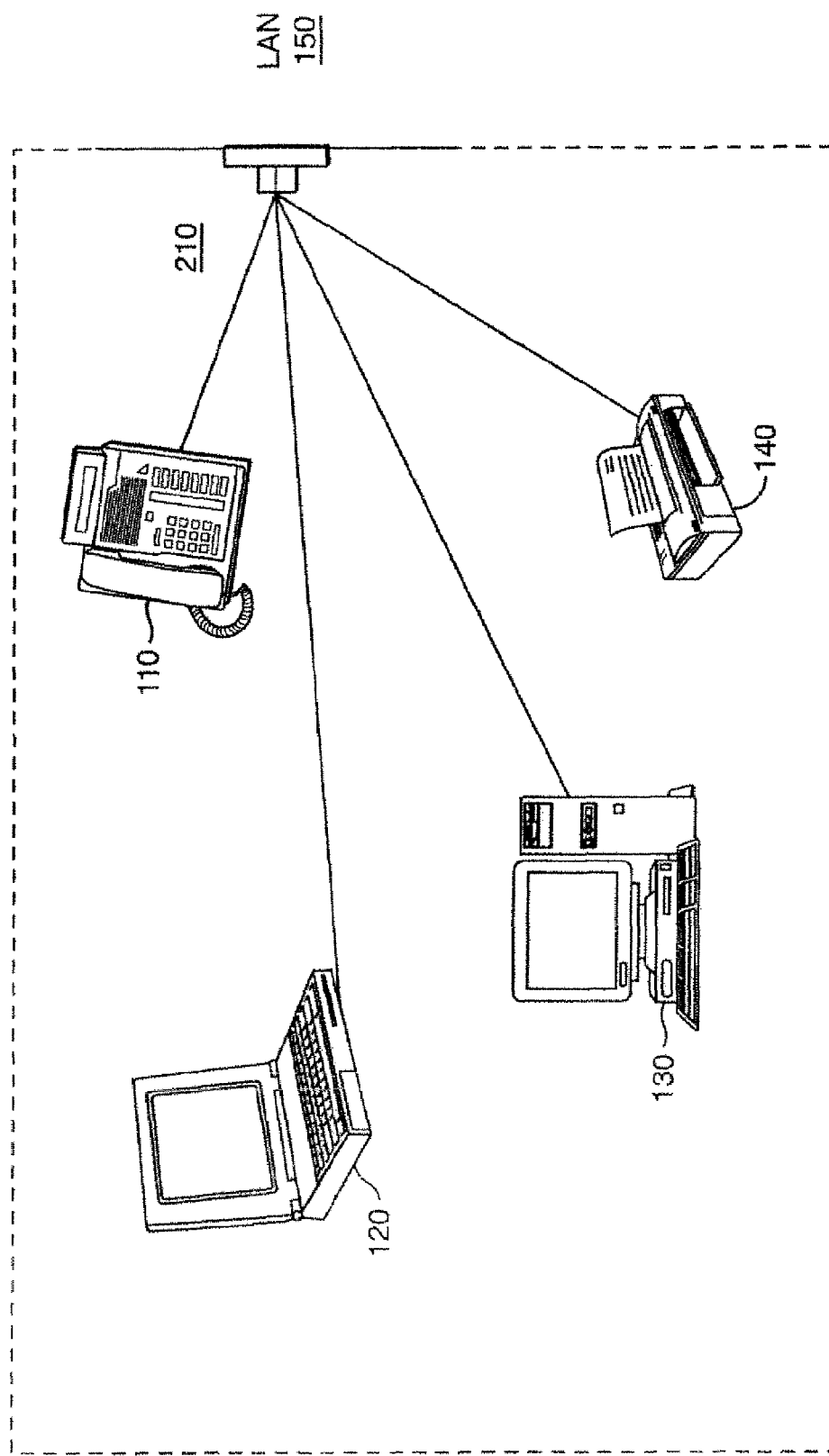
FIG. 1 illustrates an exemplary wired desktop cluster coupled to a local area network (LAN) in accordance with one embodiment of the present invention.

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "allowing", "processing", "interpreting", "providing" or the like, refer to the actions and processes of a computer system, or similar electronic computing device, such as intelligent hardware or an intelligent data concentrator. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Portions of the present invention are comprised of computer-readable and computer executable instructions which reside, for example, in computer-usable media of a computer system or intelligent hardware (e.g., an intelligent data concentrator). It is appreciated that the present invention can operate within a number of different computer systems including general purpose computer systems, embedded computer systems, and stand alone computer systems specially adapted for controlling automatic test equipment.

The present invention provides a device and method for power management of electronic devices in a personal area network coupled to intelligent hardware, also referred to herein as an intelligent data concentrator. Specifically, the present invention also provides a method and a device thereof for automatically turning off the electronic devices or placing the electronic devices in a low power mode when they are not being used or according to predefined criteria. The described method can be controlled from a remote central control site communicatively coupled to the intelligent hardware over the network, or can be controlled directly from the intelligent hardware.

FIG. 1 illustrates an exemplary personal area network (PAN) 100 coupled to a local area network (LAN) 150 in accordance with one embodiment of the present invention. PAN 100 comprises IP telephony 110, notebook 120, desktop workstation 130, and printer 140, each of which is communicatively coupled to intelligent data concentrator 210. Intelligent data concentrator 210 is coupled to LAN 150, thus acting as an interface from the various client devices (e.g., comprises IP telephony 110, notebook 120, desktop workstation 130, and printer 140) to LAN 150.

In one embodiment, the electronic devices of PAN 100 (e.g., comprises IP telephony 110, notebook 120, desktop workstation 130, and printer 140) receive power over LAN 150 through intelligent data concentrator 210. In the present embodiment, a remote power source transmits power across LAN 150 to intelligent data concentrator 210. Electronic devices coupled to intelligent data concentrator 210 are configured to receive the power they require to operate over LAN 150.

Figure 2:
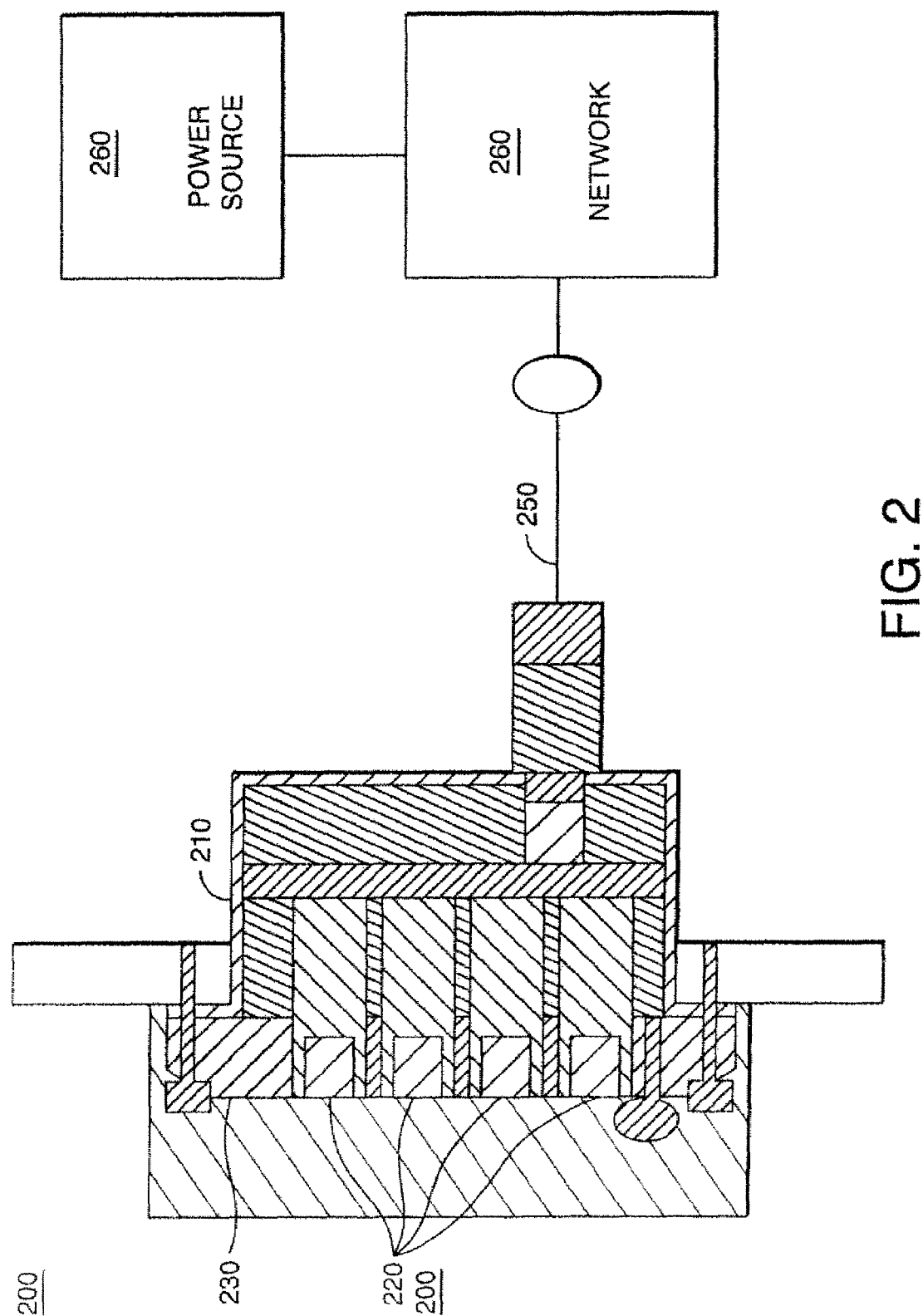
FIG. 2 is a block diagram of a cross-sectional view of an intelligent data concentrator in accordance with one embodiment of the present invention.

FIG. 2 is a block diagram 200 of a cross-sectional view of an intelligent data concentrator 210 in accordance with one embodiment of the present invention. This embodiment of the present invention implements intelligent hardware that is easy to install and reliably provides an attachment point for access to voice and data networks 240. The embodiment is implemented through miniaturized hardware that can be installed inside of a wall or in internal space provided for in an office cubicle. One surface 230 of this embodiment is intended to be accessible by the end user and would in most instances be on an external surface of a workspace.

A plurality of ports 220 are mounted on the external surface 230 of this embodiment. In one embodiment, communication port 220 is an RJ-45 jack. In another embodiment, port 220 is an RJ-11 jack. It should be appreciated that port 220 is not limited to any particular jack, and that any type of communication port can be used. Additionally, while intelligent data concentrator 210 illustrates four ports 220, it should be appreciated that alternative implementations could support a greater or lesser number of ports 220.

Connections to the central data (LAN) or voice network 240 are terminated at intelligent data concentrator 210 for coupling to ports 220. Termination of the network cabling 250 (voice or data) will provide for both a reliable electrical and mechanical connection for industry standard communications cabling such as CAT-3, CAT-5, CAT-5E or similar cabling.

In one embodiment, intelligent data concentrator 210 receives power over network cabling 250 from network 240. A remote power source 260 transmits power over network cabling 250 to provide intelligent data concentrator 210 with the power it requires to operate. In one embodiment, intelligent data concentrator 210 is configured to transmit power to connected electronic devices through ports 220.

Figure 3:
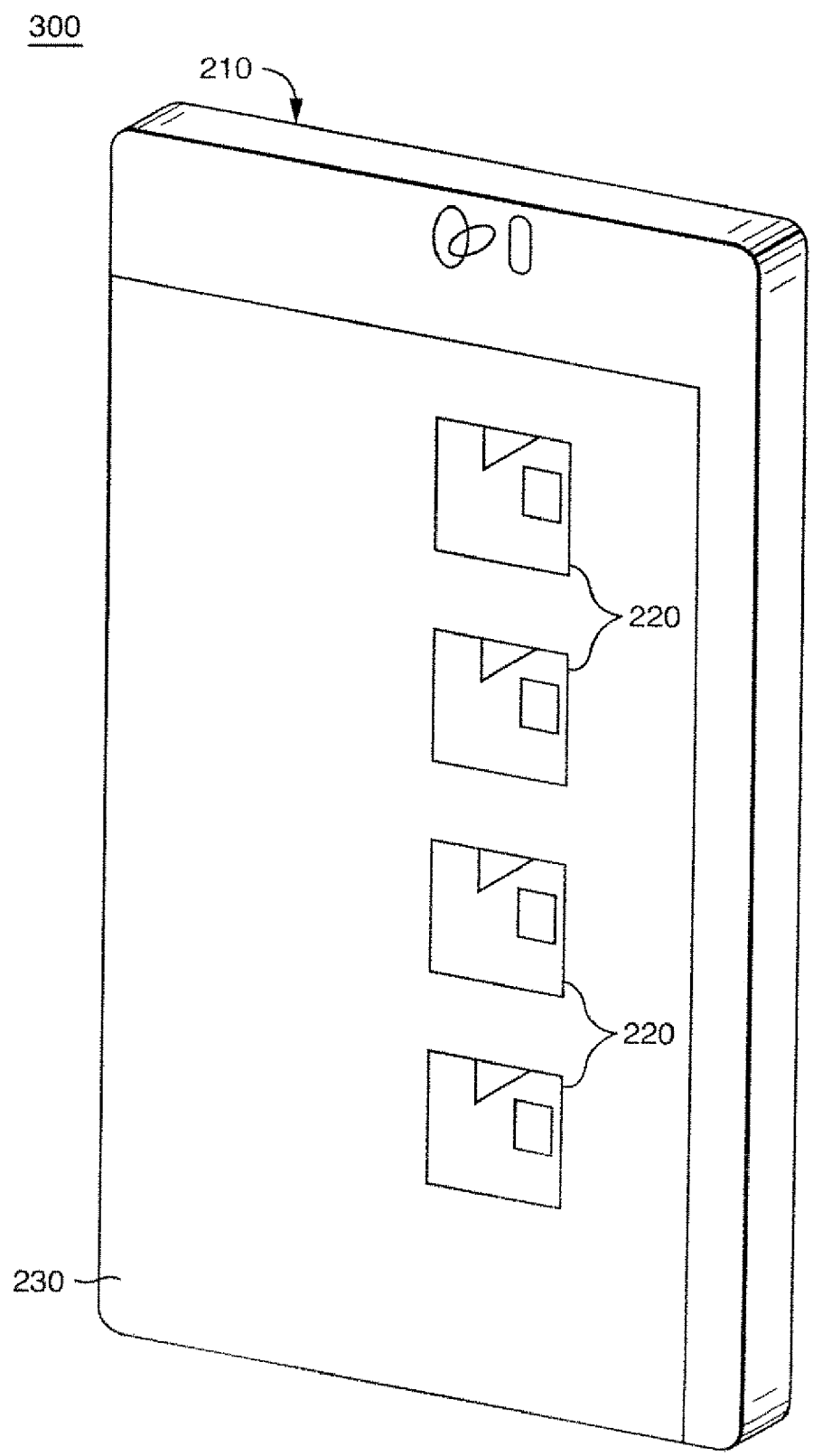
FIG. 3 is an illustration of a perspective view of an exemplary faceplate of an intelligent data concentrator in accordance with one embodiment of the present invention.

FIG. 3 is an illustration of a perspective view 300 of an exemplary user-accessible surface 230 of an intelligent data concentrator 210 in accordance with one embodiment of the present invention. A user is able to connect data devices to a voice or data network through ports 220. As described above, in one embodiment of the present invention, intelligent data concentrator 210 is configured to transmit power to connected electronic devices through ports 220.

Figure 4:
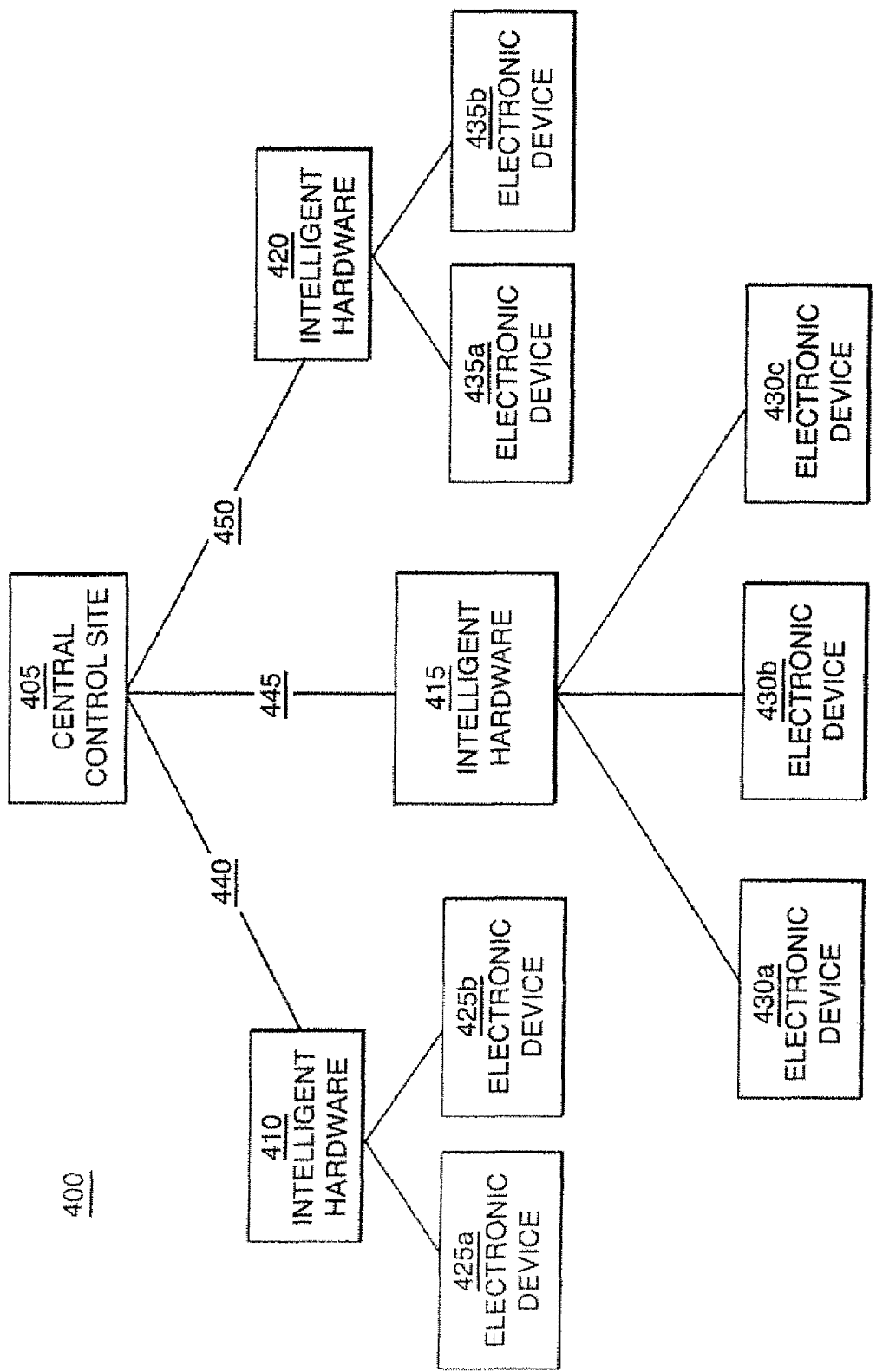
FIG. 4 is a block diagram of an exemplary LAN upon which embodiments of the present invention may be practiced.

FIG. 4 is a block diagram of an exemplary LAN 400 upon which embodiments of the present invention may be practiced. In one embodiment, LAN 400 comprises a central control site 405 and intelligent hardware 410, 415, and 420. In one embodiment, intelligent hardware 410, 415 and 420 are intelligent data concentrators (e.g., intelligent data concentrator 210 of FIG. 2 or intelligent data concentrator 602 of FIG. 6). In one embodiment, central control site 405 can access the intelligence (e.g., intelligence 612 of FIG. 6) of intelligent hardware 410, 415 and 420. In another embodiment, central control site 405 is a central data switch or hub. Intelligent hardware 410, 415 and 420 are communicatively coupled to central control site 405 over links 440, 445 and 450, respectively. In one embodiment, links 440, 445 and 450 are network cabling. In one embodiment, links 440, 445 and 450 also are coupled a power source (e.g. power source 250 of FIG. 2 or power source 609 of FIG. 6), such that they provide power to intelligent hardware 410, 415 and 420.

In one embodiment, intelligent hardware 410, 415 and 420 are connected to central control site 405 by means of network cabling. In the current embodiment, CAT 3 or 5 cabling is used and an Ethernet physical interface is employed. However, it should be appreciated that the present invention will work with other types of LANs, such as LANs with differing physical connections or adopted for use in RF wireless and optical systems. As discussed above, in one embodiment, links 440, 445 and 450 also provide power to intelligent hardware 410, 415 and 420. In one embodiment, the power is supplied over network cabling.

Intelligent hardware 410 is coupled to electronic devices 425a and 425b. Similarly, intelligent hardware 415 is coupled to electronic devices 430a, 430b and 430c, and intelligent hardware 420 is coupled to electronic devices 435a and 435b. It should be appreciated that electronic devices can comprise any number of data devices or client devices, including but not limited to: computer systems, printers, voice IP telephones, and fax machines configured for use over voice IP networks.

In one embodiment, the intelligent hardware is configured to provide power to connected electronic devices. For example, in the present embodiment, intelligent hardware 410 supplies power to electronic devices 425a and 425b. It should be appreciated that electronic devices connected to an intelligent hardware may receive power over LAN 400. Power is supplied to the intelligent hardware, and an electronic device configured to receive power through the intelligent hardware receives its operating power through the intelligent hardware.

Figure 5:
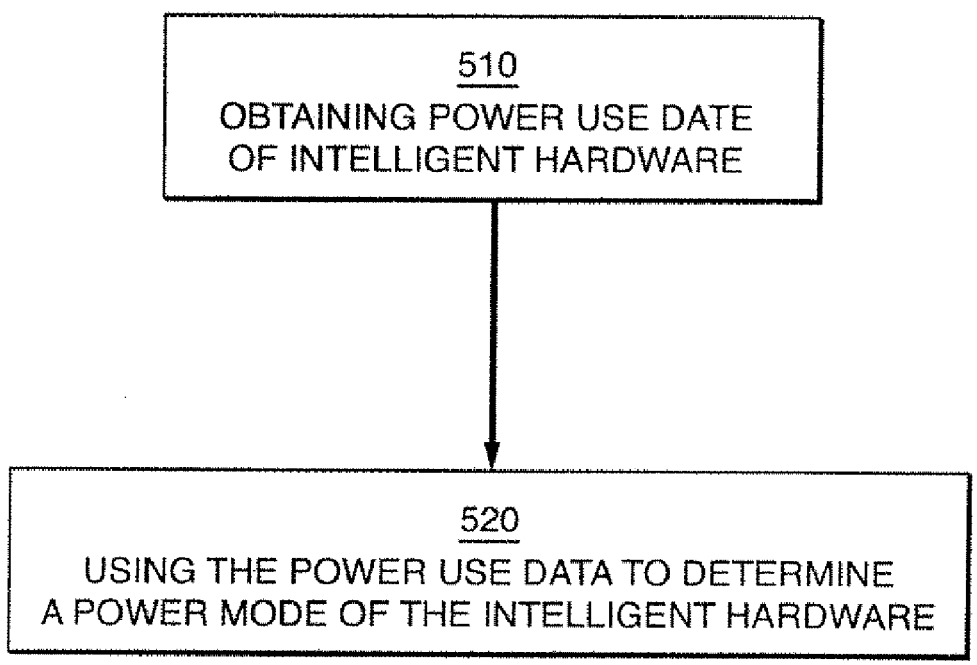
FIG. 5 is a flowchart diagram of the steps in a process for power management of intelligent hardware (e.g., an intelligent data concentrator) for providing access to voice and data networks in accordance with one embodiment of the present invention.

FIG. 5 is a flowchart diagram of the steps in a process 500 for power management of intelligent hardware (e.g., an intelligent data concentrator) for providing access to voice and data networks. Steps of process 500, in the present embodiment, may be implemented with any computer languages used by those of ordinary skill in the art.

At step 510, power use data of the intelligent hardware (e.g., intelligent data concentrator 210 of FIG. 2 or intelligent data concentrator 602 of FIG. 6) is obtained. As described above, the intelligent hardware is coupled to a power source and communicatively coupled to a voice or data network. The intelligent hardware is configured to communicatively couple a plurality of electronic devices to the network.

At step 520, using the power use data, a power mode of the intelligent hardware is determined. In one embodiment, the power use data is defined at a central control site communicatively coupled over the network to the intelligent hardware. The central control site has stored upon it instructions regarding the power mode of all connected intelligent hardware. In one embodiment, the power use data is user-defined.

In another embodiment, the power use data is predefined and stored in intelligence of said intelligent hardware. In one embodiment, the power use data is user-defined, and programmed directly into the intelligent hardware. In one embodiment, the power use data is entered into the intelligent hardware by a coupled electronic device.

In one embodiment, the low power mode or off mode is activated according to a predetermined power use data based on the time of day, week, or year. For example, a low power mode will automatically be activated after working hours (e.g., 6:00 PM through 6:00 AM), over weekends, or during holidays.

It should be appreciated that the present invention is customizable to fit the needs of specific users. For example, if boot time for a device is short, the intelligent hardware can be powered down in the evenings. Conversely, if boot time is long, only specific parts of the intelligent hardware may be powered down. Thus, a user is provided with a low power mode without disrupting their specific power needs.

In one embodiment, the power use data is obtained by detecting a level of activity of said intelligent hardware. In the present embodiment, if the intelligent hardware does not detect a predetermined level of activity for a predetermined period of time, the intelligent hardware will automatically be placed in a low power mode or off mode. For example, if the intelligent hardware detects no data transfer for a period of one hour, the intelligent hardware will automatically be placed in a low power mode or off mode. In one embodiment, once a client device begins a data transfer, the intelligent hardware is powered on, such that a user is not required to actively power on the device.

In another embodiment, activity logs of the intelligent hardware's activities is kept. The intelligent hardware will implicitly customize its power management to power on the device in times of typical user interaction and power off the device in times of no user interaction. For example, if data transfer occurs over the intelligent hardware every weekday from 7:00 AM to 5:00 PM, the intelligent hardware will power on the device during those hours. During hours of typical non-use, the intelligent hardware will be powered off.

In one embodiment, if no activity is detected over a period of days, the intelligent hardware will automatically shut off completely. In the present embodiment, the intelligent hardware determines that the office or cubicle in which the intelligent hardware is located is empty, thus necessitating a full power off. In the present embodiment, the intelligent hardware will notify the central operating unit of the shutting off of the intelligent hardware due to empty office or cube space.

Figure 6:
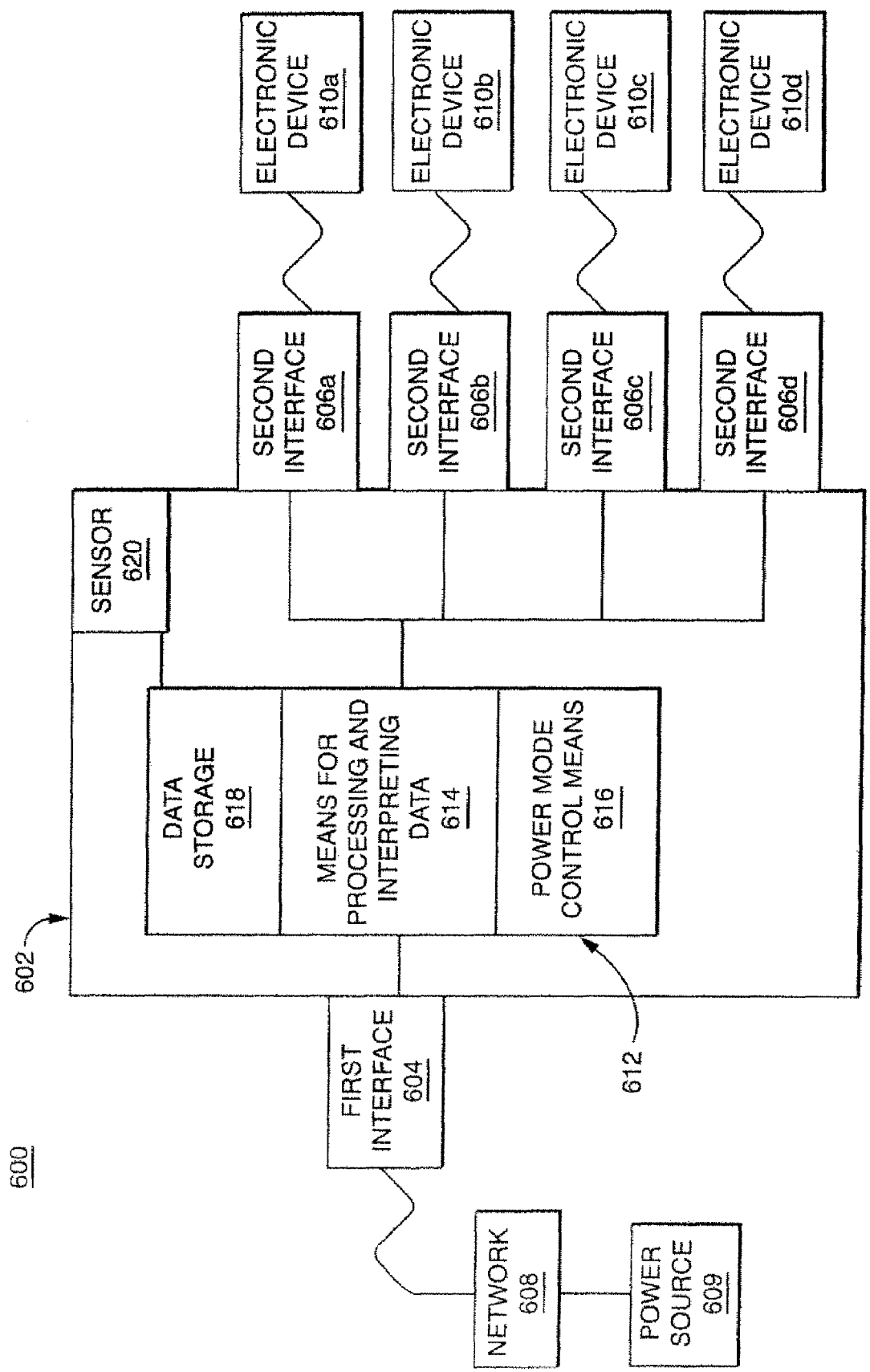
FIG. 6 is a block diagram of an intelligent data concentrator configured for performing a process of power management in accordance with an embodiment of the present invention.

In one embodiment, the intelligent hardware comprises a sensor (e.g., sensor 620 of FIG. 6). In one embodiment, the present invention comprises a motion sensor for detecting a level of motion in a predetermined area containing the electronic device. In another embodiment, the present invention comprises a heat sensor for detecting a level of heat within an area. In another embodiment, the present invention comprises a sound detector (e.g., a microphone) for detecting level of sound within an area.

In one embodiment, upon the level of detected motion falling below a user-defined minimum threshold, the intelligent hardware automatically turns off or is placed in a low power mode. Upon the level of motion falling below a minimum threshold, the intelligent hardware infers that no one is in the room at which the intelligent hardware is located. Thus, no one is using the intelligent hardware and the intelligent hardware automatically shuts off or powered down.

In another embodiment, upon the level of detected heat falling below a user-defined minimum threshold, the intelligent hardware automatically turns off or is placed in a low power mode. Upon the level of heat falling below a minimum threshold, the intelligent hardware infers that no one is in the room at which the intelligent hardware is located. Thus, no one is using the intelligent hardware and the electronic device automatically shuts off or is powered down.

Similarly, In another embodiment, upon the level of detected sound falling below a user-defined minimum threshold, the intelligent hardware automatically turns off or is placed in a low power mode. Upon the level of sound falling below a minimum threshold, the intelligent hardware infers that no one is in the room at which the intelligent hardware is located. Thus, no one is using the intelligent hardware and the intelligent hardware automatically shuts off or is powered down.

In another embodiment, upon any combination of the level of detected motion falling below a user-defined minimum threshold, the level of detected heat falling below a user-defined minimum threshold, and the level of detected sound falling below a user-defined minimum threshold, the intelligent hardware automatically turns off or is placed in a low power mode. The intelligent hardware infers that no one is in the room at which the electronic device is located. Thus, no one is using the intelligent hardware and the intelligent hardware automatically shuts off or is powered down.

In another embodiment, once the level of detected motion, level of detected heat, or level of detected sound falls below a user-defined threshold, a timer is activated. Upon the passing of a first predetermined time period, the intelligent hardware automatically turns off or is placed in a low power mode.

The present invention provides for a method and a device thereof for automatically turning off an intelligent hardware when it is not being used, therefore reducing power costs and wear on the components of the intelligent hardware.

It should be appreciated that a low power mode (e.g., data transfer detection is possible) and a power off mode (e.g., no data transfer detection is possible) are both available to the above embodiments. While some embodiments lend themselves to one mode over the other, it should be appreciated that either mode is available for all embodiments discussed above.

FIG. 6 is a block diagram 600 of an intelligent data concentrator 602 configured for performing a process of selectively providing access to a network in accordance with an embodiment of the present invention.

Intelligent data concentrator 602 comprises a first interface 604 for communicatively coupling intelligent data concentrator 602 to network 608 and for receiving power transmitted from power source 609 over network 608. Intelligent data concentrator 602 also comprises a plurality of second interfaces 606a–d for communicatively coupling intelligent data concentrator 602 to a plurality of electronic devices 610a–d. In one embodiment, second interfaces 606a–d are communication ports (e.g., communication ports 220 of FIG. 2). It should be appreciated that there can be any number of second interfaces 606a–d, and that the present invention is not meant to limit the number of second interfaces 606a–d. First interface 604 operating in conjunction with second interfaces 606a–d operates to connect electronic devices 610a–d to network 608.

In another embodiment, second interfaces 606a–d are configured to provide power to connected electronic devices. In the present embodiment, first interface 604 operating in conjunction with second interfaces 606a–d operates to connect electronic devices 610a–d to power source 609, thus providing electronic devices 610a–d with power.

Intelligent data concentrator 602 also comprises intelligence 612. In one embodiment, intelligence 612 comprises means for processing and interpreting data 614 coupled to the first interface 604, power mode control means 616 coupled to the means for processing and interpreting data 614, and data storage means 618. Means for processing and interpreting data 614 is intended to include, but not limited to: a processor, a robust processor and a central processing unit (CPU). Data storage means is intended to include, but not limited to: random access memory (RAM), read-only memory (ROM), and flash memory.

In one embodiment, power mode control means 616 is a software implementation (e.g., a hardware power mode controller) in intelligent data concentrator 602. Alternatively, power mode control means 616 can be implemented by hardware or firmware (e.g., a software or firmware power mode controller). In one embodiment, power mode control means 616 is operable to place intelligent data concentrator 602 in either a standard operating mode or a low power or power off mode.

In one embodiment, power mode control means 616 operates to detect a level of activity (e.g., data transfer) between first interface 604 and second interfaces 606a–d, and adjust the power mode of intelligent data concentrator 602 accordingly. In one embodiment, intelligent data concentrator 602 has instructions stored in data storage means 618 for operating power mode control means 616.

In one embodiment, power mode control means 616 operates in conjunction with a central control site (e.g., central control site 405 of FIG. 4) of network 608 for performing power management. In another embodiment, power mode control means is controlled by a central control site (e.g., central control site 405 of FIG. 4) for adjusting the power mode of intelligent data concentrator 602.

Intelligent data concentrator 602 also comprises a sensor 620 coupled to intelligence 612. In one embodiment, sensor 620 is a motion sensor for detecting a level of motion in a predetermined area containing intelligent data concentrator 602. In another embodiment, sensor 620 is a heat sensor for detecting a level of heat within an area. In another embodiment, sensor 620 is a sound detector (e.g., a microphone) for detecting a level of sound within an area. The functionality of sensor 620 is described in detail above with reference to FIG. 5.

The preferred embodiment of the present invention, a method for power management of intelligent hardware for providing access to voice and data networks, is thus described. While the present invention has been described in particular embodiments, it should be appreciated that the present invention should not be construed as limited by such embodiments, but rather construed according to the below claims.

What is claimed is:

1. A method for controlling power for an intelligent data concentrator, comprising:
   obtaining power use data of said intelligent data concentrator coupled to a power source and communicatively coupled to a network, wherein said intelligent data concentrator is configured to be installed within a cavity in a wall such that a user-accessible surface including a plurality of communication ports is external to and substantially planar with an external surface of the wall to provide a communicative coupling for each of a plurality of client devices to said network at said user-accessible surface; and
   using said power use data to determine a power mode of said intelligent data concentrator.

2. A method as recited in claim 1 wherein said intelligent data concentrator comprises:
   a first interface for coupling said intelligent data concentrator to said power source and communicatively coupling said intelligent data concentrator to said network;
   a second interface for communicatively coupling said intelligent data concentrator to said plurality of client devices such that each said client device is communicatively coupled to said network;
   a processor coupled to said first interface and said second interface; and
   a power mode controller coupled to said processor.

3. A method as recited in claim 1 wherein said intelligent data concentrator is communicatively coupled over said network to a central control site, said central control site for defining said power use data.

4. A method as recited in claim 1 wherein said power use data is predefined and stored in intelligence of said intelligent data concentrator.

5. A method as recited in claim 1 wherein said power use data is user-defined.

6. A method as recited in claim 1 wherein said power use data is obtained by detecting a level of activity of said intelligent data concentrator.

7. A method as recited in claim 1 wherein said power use data is obtained by detecting a level of activity within a predetermined area, said predetermined area containing said intelligent data concentrator.

8. A method as recited in claim 7 wherein said level of activity is detected by a motion detector.

9. A method as recited in claim 7 wherein said level of activity is detected by a heat sensor.

10. A method as recited in claim 7 wherein said level of activity is detected by a sound detector.

11. A method as recited in claim 1 wherein said intelligent data concentrator is configured to supply power from said power source to said plurality of client devices.

12. An intelligent data concentrator comprising:
    a housing configured to be installed within a cavity of a wall;
    a first interface for coupling said intelligent data concentrator to a power source and communicatively coupling said intelligent data concentrator to a network;
    a second interface for communicatively coupling said intelligent data concentrator to a plurality of client devices such that each said client device is communicatively coupled to said network, wherein said second interface is external to and substantially planar with an external surface of the wall to provide a plurality of communication ports, each communication port providing the communicative coupling for one of the plurality of client devices;
    a processor coupled to said first interface and said second interface; and
    a power mode controller coupled to said processor, said power mode controller configured to obtain power use data of said intelligent data concentrator and configured to use said power use data to determine a power mode of said intelligent data concentrator;
    wherein said first interface, said second interface, said processor and said power mode controller are comprised within said housing.

13. An intelligent data concentrator as recited in claim 12 wherein said intelligent data concentrator is communicatively coupled over said network to a central control site, said central control site for defining said power use data.

14. An intelligent data concentrator as recited in claim 12 wherein said power use data is predefined and stored in intelligence of said intelligent data concentrator.

15. An intelligent data concentrator as recited in claim 12 wherein said power use data is user-defined.

16. An intelligent data concentrator as recited in claim 12 wherein said power use data is obtained by detecting a level of activity of said intelligent data concentrator.

17. An intelligent data concentrator as recited in claim 12 wherein said power use data is obtained by detecting a level of activity within a predetermined area, said predetermined area containing said intelligent data concentrator.

18. An intelligent data concentrator as recited in claim 17 wherein said level of activity is detected by a motion detector.

19. An intelligent data concentrator as recited in claim 17 wherein said level of activity is detected by a heat sensor.

20. An intelligent data concentrator as recited in claim 17 wherein said level of activity is detected by a sound detector.

21. An intelligent data concentrator as recited in claim 12 wherein said intelligent data concentrator is configured to supply power from said power source to said client devices.

22. An intelligent data concentrator comprising:
    a housing configured to be installed within a cavity of a wall;
    a first interface for coupling said intelligent data concentrator to a power source and communicatively coupling said intelligent data concentrator to a network;
    a second interface for communicatively coupling said intelligent data concentrator to a plurality of client devices such that each said client device is communicatively coupled to said network, wherein said second interface includes a plurality of communication ports external to and substantially planar with an external surface of the wall to provide the communicative coupling for each of the plurality of client devices to said network;

a means for processing and interpreting data coupled to said first interface and said second interface; and a power mode control means coupled to said means for processing and interpreting data, said power mode control means configured to obtain power use data of said intelligent data concentrator and configured to use said power use data to determine a power mode of said intelligent data concentrator;

wherein said first interface, said second interface, said means for processing and interpreting data and said power mode control means are comprised within said housing.

23. An intelligent data concentrator as recited in claim 22 wherein said intelligent data concentrator is communicatively coupled over said network to a central control site, said central control site for defining said power use data.

24. An intelligent data concentrator as recited in claim 22 wherein said power use data is predefined and stored in intelligence of said intelligent data concentrator.

25. A method as recited in claim 22 wherein said power use data is user-defined.

26. An intelligent data concentrator as recited in claim 22 wherein said power use data is obtained by detecting a level of activity of said intelligent data concentrator.

27. An intelligent data concentrator as recited in claim 22 wherein said power use data is obtained by detecting a level of activity within a predetermined area, said predetermined area containing said intelligent data concentrator.

28. An intelligent data concentrator as recited in claim 27 wherein said level of activity is detected by a motion detector.

29. An intelligent data concentrator as recited in claim 27 wherein said level of activity is detected by a heat sensor.

30. An intelligent data concentrator as recited in claim 27 wherein said level of activity is detected by a sound detector.

31. An intelligent data concentrator as recited in claim 22 wherein said intelligent data concentrator is configured to supply power from said power source to said plurality of client devices.

* * * * *